United States Patent [19]

Garris et al.

[11] Patent Number: 5,475,685
[45] Date of Patent: Dec. 12, 1995

[54] MULTI-MEDIA FLOW CONTROL OVER FDDI SYNCHRONOUS NETWORKS

[75] Inventors: Donald R. Garris, Warrenton; Donald R. Staddon, Jr., Manassas, both of Va.

[73] Assignee: International Business Machines Corporation, Armonk, N.Y.

[21] Appl. No.: 437,856

[22] Filed: Dec. 7, 1994

Related U.S. Application Data

[63] Continuation of Ser. No. 145,007, Oct. 27, 1993, abandoned.

[51] Int. Cl.⁶ .................................................. H04L 12/43
[52] U.S. Cl. ........................... 370/82; 370/84; 370/85.5; 370/85.12; 370/85.15; 370/94.2; 359/119
[58] Field of Search ............................ 370/79, 82, 84, 370/85.4, 85.5, 85.12, 85.15, 94.2; 359/119

[56] References Cited

U.S. PATENT DOCUMENTS

| | | | |
|---|---|---|---|
| 4,410,889 | 10/1983 | Bryant et al. | 340/825.2 |
| 4,713,807 | 12/1987 | Caves et al. | 370/94 |
| 4,763,321 | 8/1988 | Calvignac et al. | 370/94 |
| 4,866,704 | 9/1989 | Bergman | 370/85.4 |
| 4,866,709 | 9/1989 | West et al. | 370/82 |
| 4,926,418 | 8/1990 | Cidon et al. | 370/85.5 |
| 4,959,862 | 9/1990 | Davidov et al. | 380/10 |
| 4,964,113 | 10/1990 | Geyer et al. | 370/85.5 |
| 4,977,582 | 12/1990 | Nichols et al. | 375/118 |
| 4,979,167 | 12/1990 | McCool | 370/85.4 |
| 5,027,348 | 6/1991 | Curry, Jr. | 370/85.1 |
| 5,043,981 | 8/1991 | Firoozmand et al. | 370/85.1 |
| 5,164,938 | 11/1992 | Jurkevich et al. | 370/60 |
| 5,282,199 | 1/1994 | Herzberg et al. | 370/85.14 |

*Primary Examiner*—Wellington Chin
*Assistant Examiner*—Russell Blum
*Attorney, Agent, or Firm*—Whitham, Curtis, Whitham & McGinn; John D. Flynn

[57] ABSTRACT

A flow control protocol is used to optimize the throughput on transmission opportunities without exceeding the allocated bandwidth in a Fiber optic Distributed Data Interface (FDDI) Local Area Network (LAN). The flow control protocol limits the number of flames that a station can chain together to a maximum number that insures that the station does not exceed its bandwidth allocation per Token opportunity. When this maximum number is reached, the current chain is placed in a first-in, first-out (FIFO) queue to await the next transmission opportunity. When a chain is enabled for transmission, subsequent flames are placed on a free standby chain, and this process continues until the maximum allowed number of frames is reached. By either chaining together fewer flames than the maximum number or continuing to the maximum number, the number of frames to be chained together in the current chain is optimized providing improved performance.

6 Claims, 8 Drawing Sheets

COMPLETED
(ONE FRAME)

CURRENT
(EMPTY)

STANDBY
(EMPTY)

STANDBY

COMPLETED
(ONE FRAME)

COMPLETED
(MAX FRAMES)

CURRENT
(EMPTY)

STANDBY
(EMPTY)

STANDBY
•
•
•

STANDBY
(EMPTY)

COMPLETED
(n # of FRAMES)

CURRENT
(EMPTY)

STANDBY
(EMPTY)

STANDBY
•
•
•

FIG.6

STANDBY
(EMPTY)

COMPLETED
(MAX FRAMES)

CURRENT
(n # of FRAMES)

STANDBY
(EMPTY)

STANDBY
•
•
•

MULTI-MEDIA FLOW CONTROL OVER FDDI SYNCHRONOUS NETWORKS

This is a continuation of 08/145,007, filed Oct. 27, 1992, now abandoned.

BACKGROUND OF THE INVENTION

1. Field of the Invention

The present invention generally relates to a flow control protocol for a data transmission network and, more particularly, to a flow control over Fiber optic Distributed Data Interface (FDDI) synchronous networks and is specifically advantageous in teleconferencing and other multi-media applications requiring synchronous as opposed to asynchronous data transmission.

2. Description of the Prior Art

Local Area Networks (LANs) have long provided a medium for sharing data supporting electronic mail (E-mail) among people, but with the advent of multimedia applications supporting audio and video data, real time teleconferencing is now possible. The integration of audio and video in networked personal computers (PCs) enables many new kinds of collaborative work. Built-in video capabilities can support analog video signals from cable or a video cassette recorder (VCR), for example, or digital video from compact disk read only memory (CD-ROM). This in turn makes possible desktop video and document conferencing systems that support collaborative document mark-up and real-time video-in-a-window. In a typical document conferencing application, a "master" user owns the document and runs the application that created it, and one or more "slave" users see a bit-mapped image of the document that they can mark up and annotate in real time. There may be multiple simultaneous masters and slaves, allowing one node of a network to share a spreadsheet with other nodes while another node shares a document which may either reference the spreadsheet or import data from the spreadsheet.

"Whiteboarding" is the ability to draw or type on a blank white window on the video screen in an "ink" color-coded by the user. International Business Machines Corp. (IBM) sells a whiteboarding and document-sharing package, Person-to-Person/2, for its OS/2 operating system that also supports live videoconferencing via IBM's Action-Media II card. This package allows a plurality of users to share a common chalkboard or to mark up documents at the same time. The number of users, however, is limited by the token ring and ethernet LANs on which it runs.

There are many similarities between the FDDI standard and the IEEE 802.5 token-ring standard, but there are some significant differences, chief among which is bandwidth. Communication volume over a LAN is limited by the transmission medium and also by the topology and the relevant protocols at both the physical and medium access control levels. "Bandwidth" is a measure of the communication capacity of a LAN and is commonly given in bits per second (bps). For example, the bandwidth of a coaxial cable ethernet LAN may be 10 million bits per second (Mbps) while a Fiber optic Distributed Data Interface (FDDI) LAN using a timed-token protocol may be 100 Mbps. In addition to bandwidth, FDDI LANs also typically support a greater number of stations with greater reliability, due in part to the "self healing" properties designed into the FDDI ring. The FDDI standard was established by the American National Standards Institute (ANSI) and approved for international use by the International Standards Organization ISO).

FDDI synchronous transmission provides a near constant, low latency service for those applications requiring synchronous data transmission under various loads and configurations. An end station in an FDDI synchronous network must not exceed its synchronous bandwidth allocation on any given transmission opportunity. However, the end station must account for a variable bit rate from a particular multi-media session and also for the simultaneous variation of the throughput as other multi-media sessions are opened and closed. Another factor related to the transmission of data onto the media is the asynchronous nature of the arrival of the transmission opportunity.

SUMMARY OF THE INVENTION

It is therefore an object of the present invention to provide a flow control protocol which optimizes the throughput on transmission opportunities without exceeding the allocated bandwidth.

According to the invention, there is provided a flow control protocol implemented on an FDDI LAN wherein the number of frames that a station can chain together is limited to a maximum number that insures that the station does not exceed its bandwidth allocation per Token opportunity. Thus, when this maximum number is reached, the current chain is placed in a first-in, first-out (FIFO) queue to await the next transmission opportunity. When a chain is enabled for transmission, subsequent frames are placed on a free standby chain, and this process continues until the maximum allowed number of frames is reached. By either chaining together fewer frames than the maximum number or continuing to the maximum number, the number of frames to be chained together in the current chain is optimized providing improved performance.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
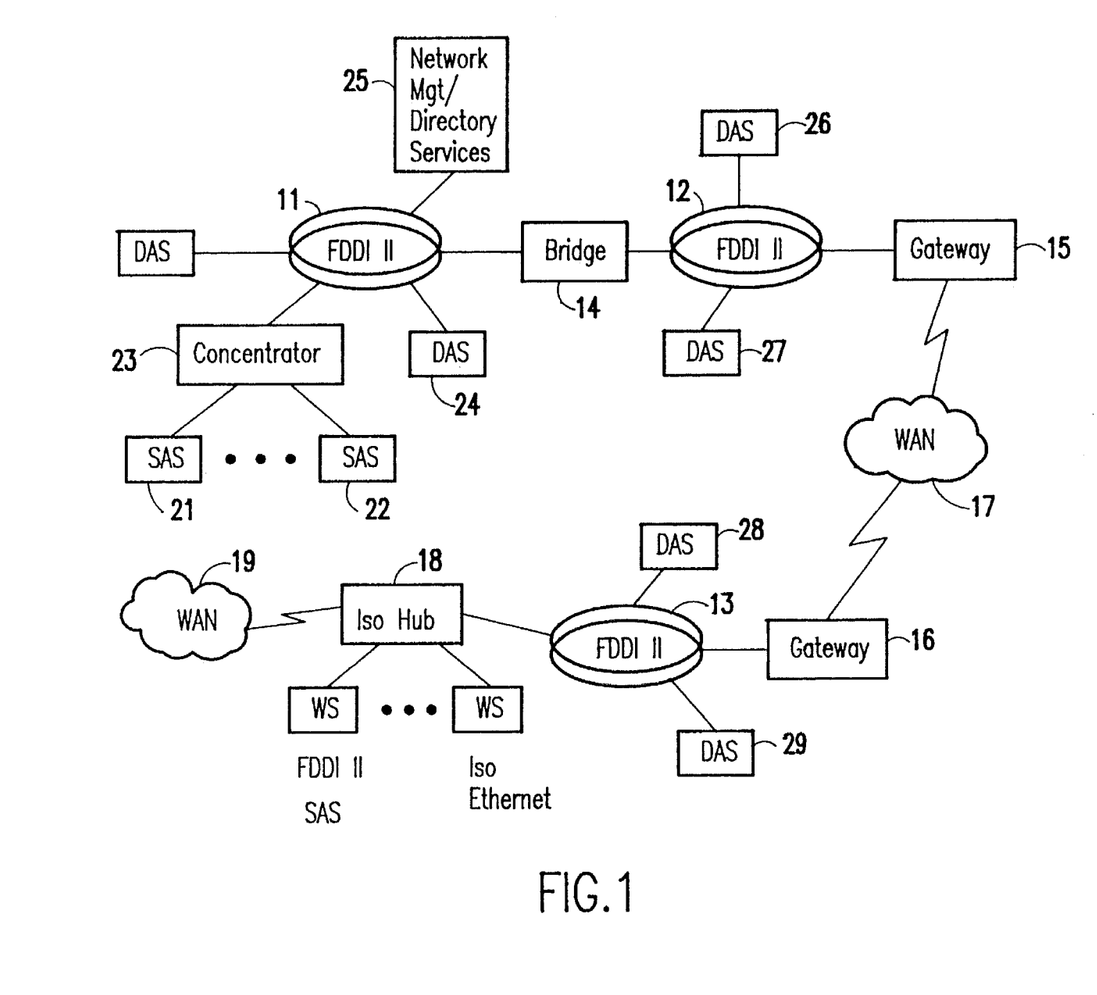
FIG. 1 is a block diagram of a typical multimedia network on which the invention may be implemented.

Referring now to the drawings, and more particularly to FIG. 1, there is shown a typical multi-media network on which the protocol according to the invention may be implemented. The network may have a plurality of FDDI rings 11, 12 and 13. These rings are designated as FDDI-II, which is a superset of the FDDI standard which provides isosynchronous transmission to users of the network. The FDDI rings may be locally connected as by a bridge 14 to form an extended LAN, or the FDDI rings may be connected by gateways 15 and 16 and a Wide Area Network (WAN) 17. Further, an FDDI ring might be connected to an isosynchronous hub 18 to another WAN 19.

Connected to FDDI ring 11 are a plurality of Single Attachment Stations (SASs) 21 to 22 via a concentrator 23. A Dual Attachment Station (DAS) 24 is shown connected directly to the dual ring of the FDDI ring 11, but could be connected via a concentrator. Also connected to FDDI ring 11 is a network management and directory services server 25. The FDDI ring 12 is shown with DASs 26 and 27, and the FDDI ring 13 is similarly shown with DASs 28 and 29, but it will be understood that the configuration shown is both simplified and illustrative which, in a specific installation, would typically have many more stations, concentrators and servers.

Figure 2:
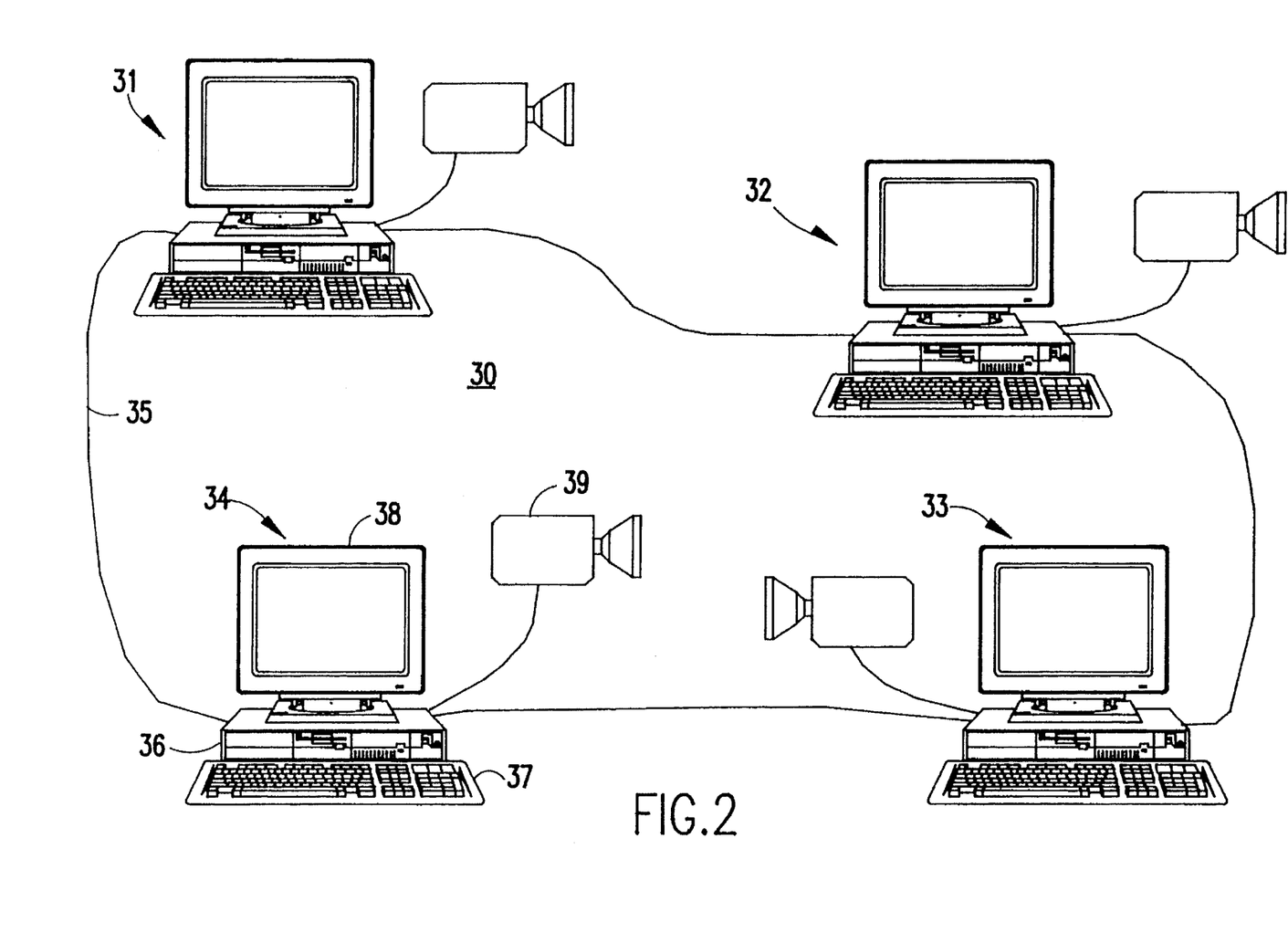
FIG. 2 is a block diagram of a small part of the multimedia network shown in FIG. 1 to illustrate a specific application.

FIG. 2 illustrates a particular multimedia application, and for simplicity of illustration, only a single ring is shown. The FDDI ring 30 is composed of PCs 31 to 34 connected by fiber optic cabling 35. Each PC includes a system unit 36, a keyboard 37 and a display device 38. Connected to each PC is a video camera 39, and this camera includes a microphone, not shown. The image and voice of a user at one PC may thus be transmitted to other PCs in the network. Although not shown, the network may include a server storing data accessible by the several PCs in the network. Each PC runs an operating system, such as IBM's OS/2 operating system, and supports a plurality of application programs, such as word processors, spreadsheets, databases, and the like, either locally or at the server (not shown). Each PC also runs a "whiteboarding" and document-sharing package, such as IBM's Person-to-Person/2 package, to allow real time chalk board sessions.

It will be readily apparent that real time conferencing supported by the configuration generally shown in FIG. 2 requires a large bandwidth and synchronous transmission. This is made possible by the FDDI standard. Even so, unless particular care is taken in designing the transmission protocol, there is a significant possibility that the bandwidth of the system will be exceeded at some times and under utilized at other times, due in part to inherent asynchronous aspects of the teleconferencing process.

In the description of the preferred embodiment of the invention, a chain is generally defined as a series of linked frames that are transmitted as a single unit on a transmission opportunity. The flow control protocol according to the invention manages synchronous services by maintaining chains of synchronous frames, where each chain contains the optimum number of frames that may be transmitted on a transmission opportunity without exceeding the allocated bandwidth. This protocol is implemented with the following two algorithms.

The first algorithm calculates the maximum number of frames that may be chained together in a single chain. The Station Management (SMT) portion of the FDDI standard specifies that the total synchronous payload for a multimedia session is to be segmented into frames based on the current negotiated response time (T_Neg). The T_Neg value of the FDDI network is the average time that each station can expect for a transmission opportunity. The maximum size of a frame for a given session can be computed by multiplying the maximum bit rate of the payload for that session by T_Neg. The examples given in the standard result in flames that do not exceed the maximum size frame supported by the FDDI Media Access Control protocol (MAC) and physical layer protocol (PHY) standards (4478 bytes). This part of the protocol expands on those examples to indicate how to segment payloads into frames that would exceed the maximum size frame.

If the bit rate of the payload for a session would result in a total number of bytes, T, per T_Neg being less than or equal to 4478 bytes, then for a selected frame size, F (bytes/frame), the payload is packetized into n=T/F frames. For the case where T≦4478 and F=T, the maximum number of frames per T_Neg that the session will transmit on a transmission opportunity without exceeding the allocated bandwidth is one. If on the other hand the bit rate of the payload would result in a frame size per T_Neg being greater than 4478 bytes/frame bytes and if F=4478, then the maximum number of frames that the session will transmit on a transmission opportunity without exceeding the allocated bandwidth is T divided by 4478 and rounded up to the nearest integer. Using an example of a 10 Mbps bit rate allocation and a 8 ms T_Neg, T would be 10,000 bytes, and the maximum number, n, of frames per T_Neg would be three (10,000/4478=2.2, rounded up =3). Three 3.33K frames or two 4K frames plus one 2K frame are two possible choices. For the second example of two 4K frames plus one 2K frame, note that although F was fixed at 4478 for the purpose of computing n, the actual frame size of the third frame was less than 4478. The practice of the invention allows packetization of data into frames based on either fixed byte counts, as in the first example with three 3.33K frames, or fixed time intervals, as in the second example. Either method is consistent with the second flow control algorithm described below.

Finally, the total maximum number N of synchronous frames that may be chained together in a single chain is determined by adding together the maximum number n of frames for each active session. That is, $N=\Sigma n_i$, where N is the total number of frames a station can send at a token opportunity and $n_i$ represents the number of frames chained for an active session, i, or application.

Two observations should be pointed out about this part of the protocol. First, the maximum size frame supported by the FDDI MAC and PHY standards (4478 bytes) is the recommended value used in packetizing the payload. While other values may be acceptable, this value reduces the frame overhead and increases the utilization of the available bandwidth of the network. Second, bandwidth is allocated on the basis of a single transmission opportunity and is required to be observed when packetizing the payload. Thus, in the above example, two 4K frames every four T_Neg times followed by three 4K frames every fifth T_Neg time is not acceptable, since 12,000 bytes per T_Neg (an apparent 12 Mbps bit rate) on the fifth transmission opportunity exceeds the allocation of only 10,000 bytes per T_Neg (10 Mbps bit rate). A session could packetize its payload in this way by requesting an allocation of 12 Mbps, the maximum number of frames per T_Neg that would be transmitted.

Limiting the number of frames that can be chained together to this maximum number insures that the station does not exceed its bandwidth allocation per Token opportunity. The uniqueness of this part of the protocol is the use of a software algorithm to limit transmission time based on frame size and the maximum number of frames chained together. Other mechanisms that could be used to provide this flow control include the use of a hardware timer, or the use of tag bits associated with frames to indicate the start and stop of a session's allocation.

The second algorithm is used to compute the optimum number of frames to be chained together. The optimum number of frames to be chained together for transmission is not always the maximum number. In the above example of a maximum 10 Mbps bit rate, an 8 ms T_Neg and a frame size of 4478 bytes, the maximum number of frames per T_Neg was three. When the multi-media session is opened, if the timing is such that only the first frame is ready for transmission when the transmission opportunity arrives, then waiting for the second and third frame before completing the chain for transmission would result in a missed transmission opportunity for the frame that was ready (chained, but maximum number not reached) for transmission. Likewise, in the course of a session, if the bit rate were to temporarily drop such that the payload only required two flames per T_Neg, then waiting for the third frame before completing the chain for transmission would result in a missed transmission opportunity for the two flames that were ready for transmission. A similar situation occurs for the maximum bit rate case if the transmission opportunity arrives early. If the transmission opportunity arrives early, then waiting for the second or third flame before completing the chain for transmission would result in a missed transmission opportunity for the one or two frames that were ready for transmission. This part of the protocol optimizes the flow control to account for these and other variations in throughput. When flames are ready for transmission, the algorithm determines the optimum number of flames to be chained together in the current chain as follows.

Figure 3:
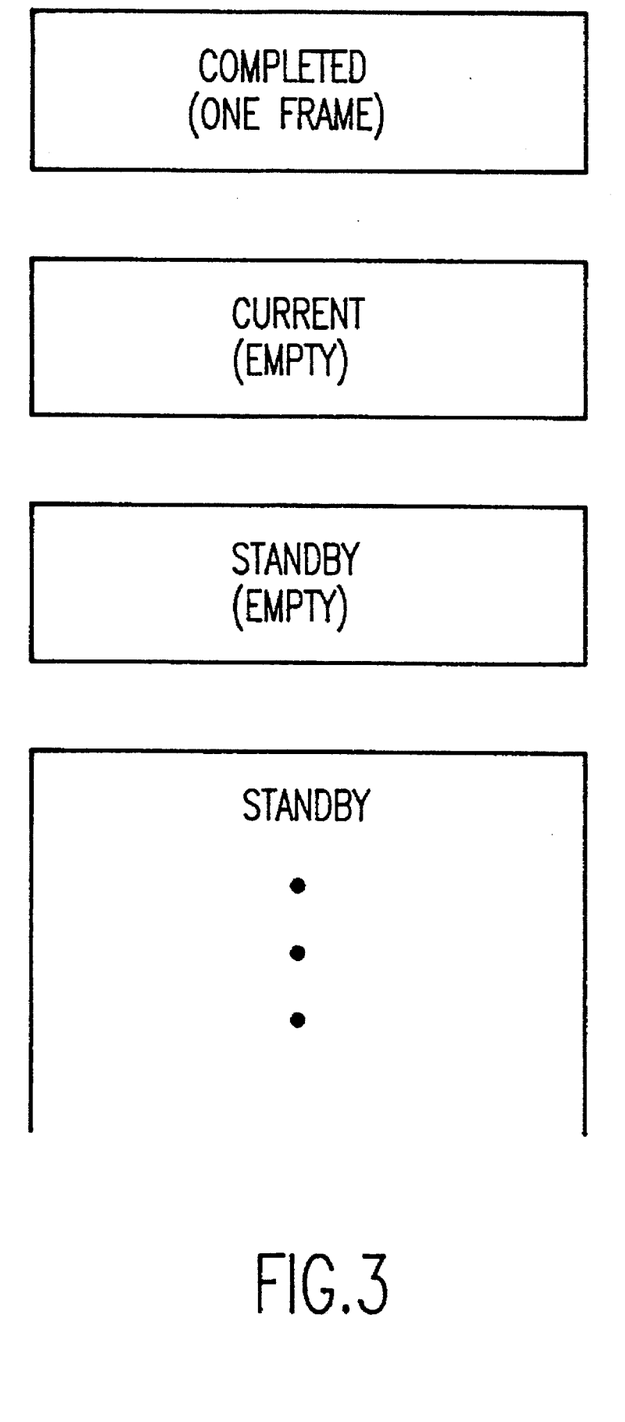
FIG. 3 is a block diagram illustrating a first available chained frame according to the protocol of the invention.

If there is no completed chain (no chain that has been enabled for transmission on the next transmission opportunity), then the first available frame is placed on the current chain, this current chain is enabled for transmission, and subsequent flames are placed on a flee standby chain. The "current" chain thus becomes a completed chain, and a "standby" chain becomes the new current chain. Initially, all chains are empty (the first chain is the current chain and all remaining chains are standby chains). Completed chains are queued for transmission in a First-In, First-Out (FIFO) order. FIG. 3 illustrates how the chains appear after the first available frame is placed on the current chain.

Because the arrival time of the transmission opportunity is asynchronous to the availability of flames for transmission, forming a chain of a single frame increases the probability of transmission on the next opportunity. This pan of the algorithm may have some inefficiency if the transmission opportunity occurs after additional frames are ready, since all additional frames are placed on a standby chain. However, as outlined below, these frames are guaranteed to be transmitted on the next transmission opportunity. In addition, the algorithm utilizes the standby chain to begin to synchronize the arrival time of the transmission opportunity with the availability of frames for transmission.

Figure 4:
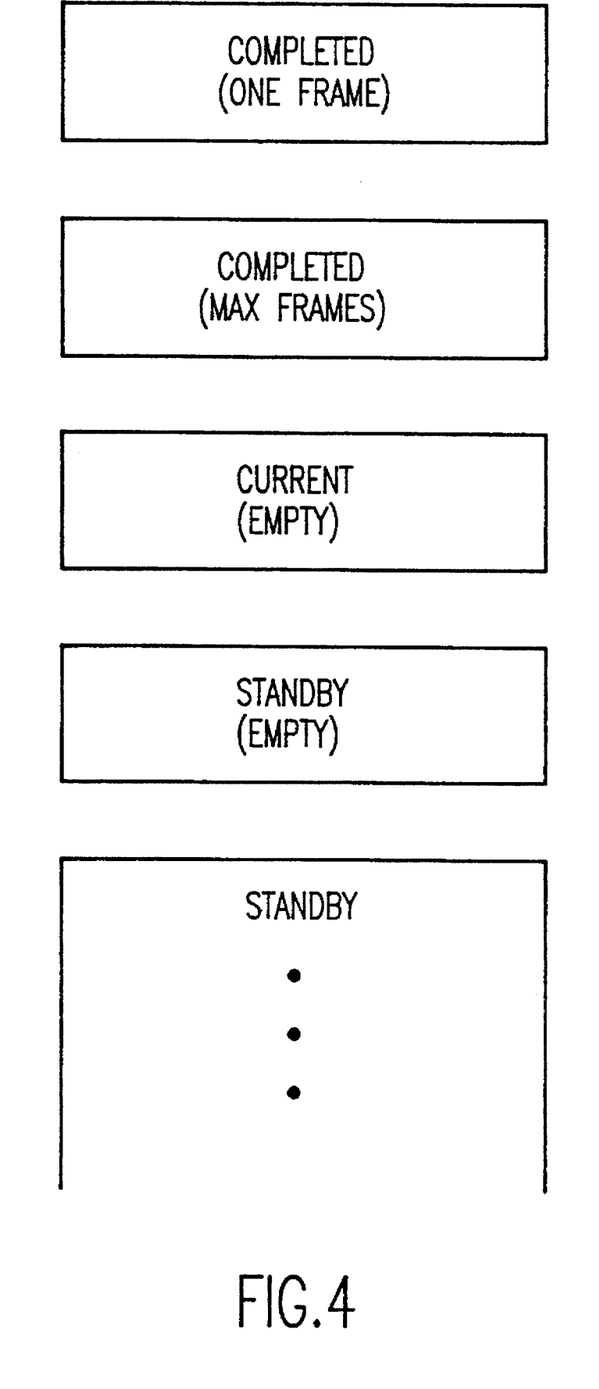
FIG. 4 is a block diagram illustrating a maximum number of frames chained according to the protocol.

If there is at least one chain (a chain that has been enabled for transmission on the next transmission opportunity), then the next available frame is placed on the current chain until either the maximum allowed number of frames is reached or until a completed chain is transmitted. When a "completed" chain is transmitted, that chain becomes a free standby chain. If the maximum allowed number of frames is reached, then the current chain is enabled for transmission, and subsequent frames are placed on a free standby chain. Referring to FIG. 3 as a starting point, FIG. 4 illustrates how the chains appear after the maximum allowed number of frames is reached. The standby chains also act as buffers to account for the worst case arrival time of the transmission opportunity which may be greater than T_Neg.

Figure 5:
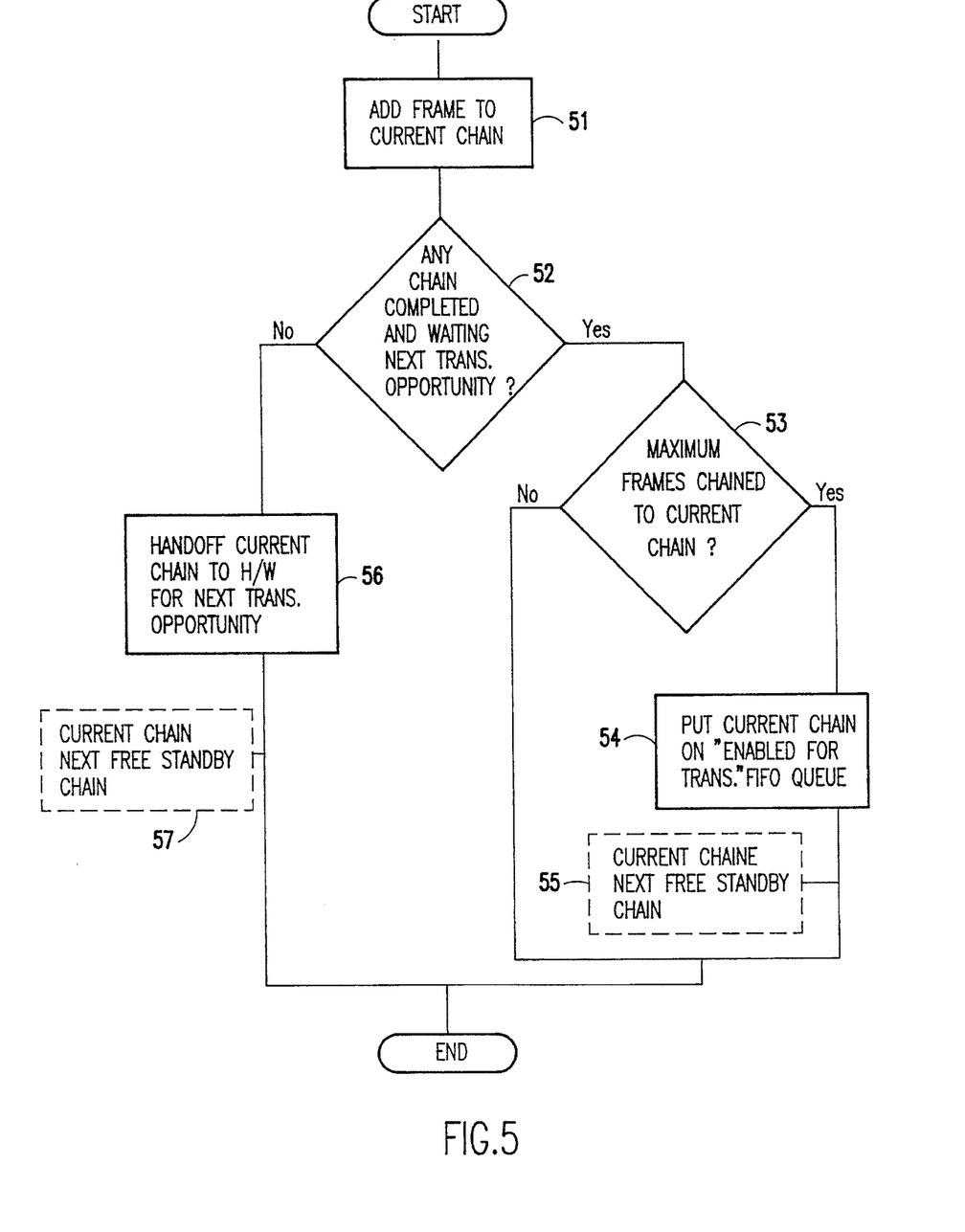
FIG. 5 is a flow diagram showing the logic of the adding a new frame to a current chain.

FIG. 5 is a flow diagram of the logic to add a new frame to the current chain. When a frame is to be added to the current chain in function block 51, a test is made in decision block 52 to determine if there is a chain completed and waiting the next transmission opportunity. If so, a further test is made in decision block 53 to determine if the maximum number of frames are chained in the current frame. If so, the current chain is placed on the "enabled for transmission" FIFO queue in function block 54. The next standby chain becomes the current chain, as indicated by the dotted function block 55, and the process ends. If the maximum number of frames have not been chained in the current chain, as determined in decision block 53, then the frame is simply added to the chain and the process ends. If no chain is completed and waiting the next transmission opportunity, as determined in decision block 52, the current chain is handed off to the hardware for the next transmission opportunity in function block 56. The next standby chain becomes the current chain, as indicated by the dotted function block 57, and the process ends.

Figure 6:
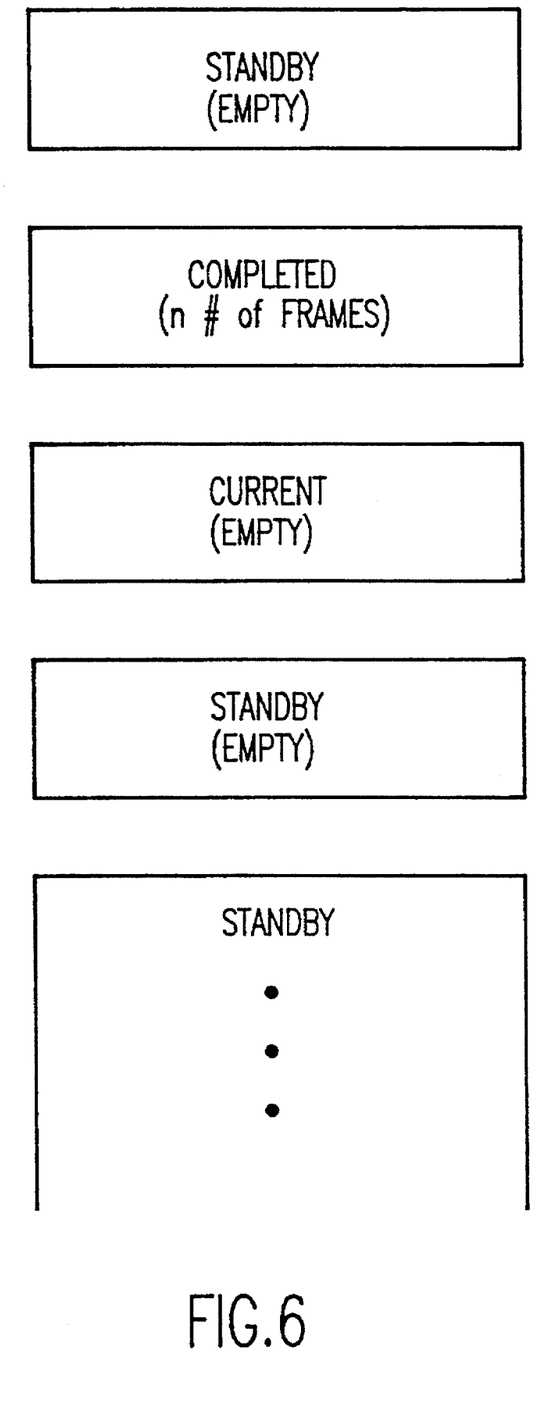
FIG. 6 is a block diagram illustrating an optimum number of frames chains according to the protocol.
Figure 7:
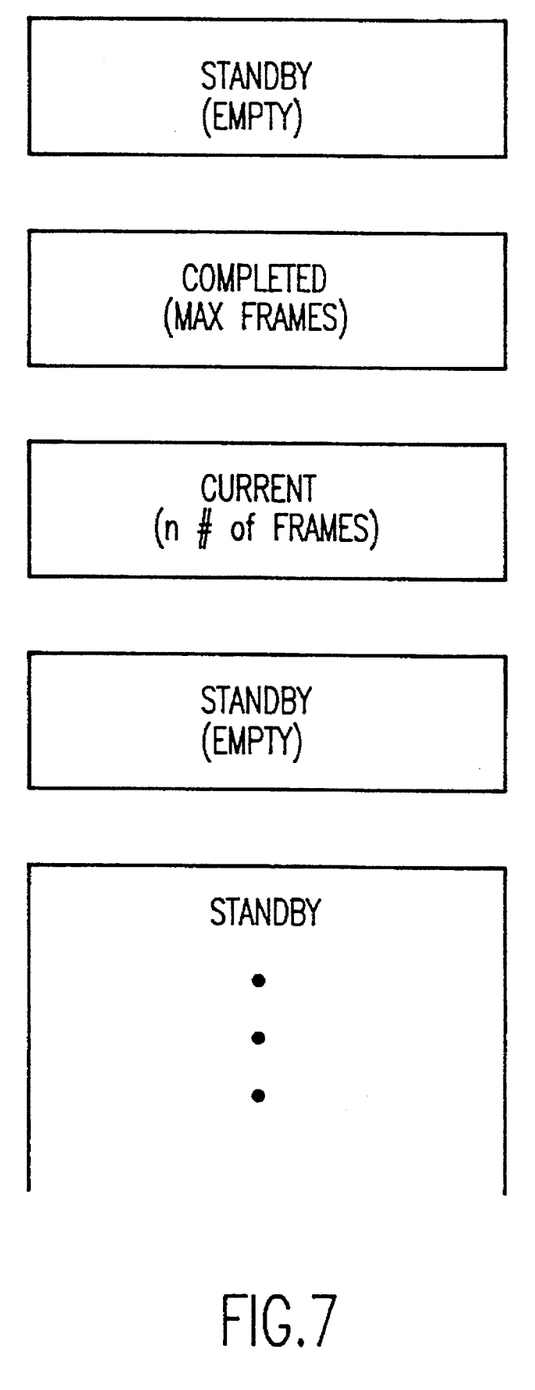
FIG. 7 is a block diagram illustrating how the chains appear after a completed chain is transmitted and there is at least one other completed chain.

When a completed chain is transmitted, the algorithm will test if them are any additional completed chains and proceed as follows. If a completed chain is transmitted and there are no other completed chains, then no additional frames are placed on the current chain, the current chain is enabled for transmission, and subsequent frames are placed on a free standby chain. Assuming that n frames have been chained together on the current chain in FIG. 3, FIG. 6 illustrates how the chains appear after a completed chain is transmitted and there are no other completed chains. If a completed chain is transmitted and there is at least one other chain, then the next available frame is placed on the current chain until the maximum allowed number is reached. Assuming that n frames have been chained together on the current chain in FIG. 4, FIG. 7 illustrates how the chains appear after a completed chain is transmitted and there is at least one other completed chain. By either chaining together fewer frames than the maximum number or continuing to the maximum number, this part of the algorithm optimizes the number of frames to be chained together in the current chain.

Figure 8:
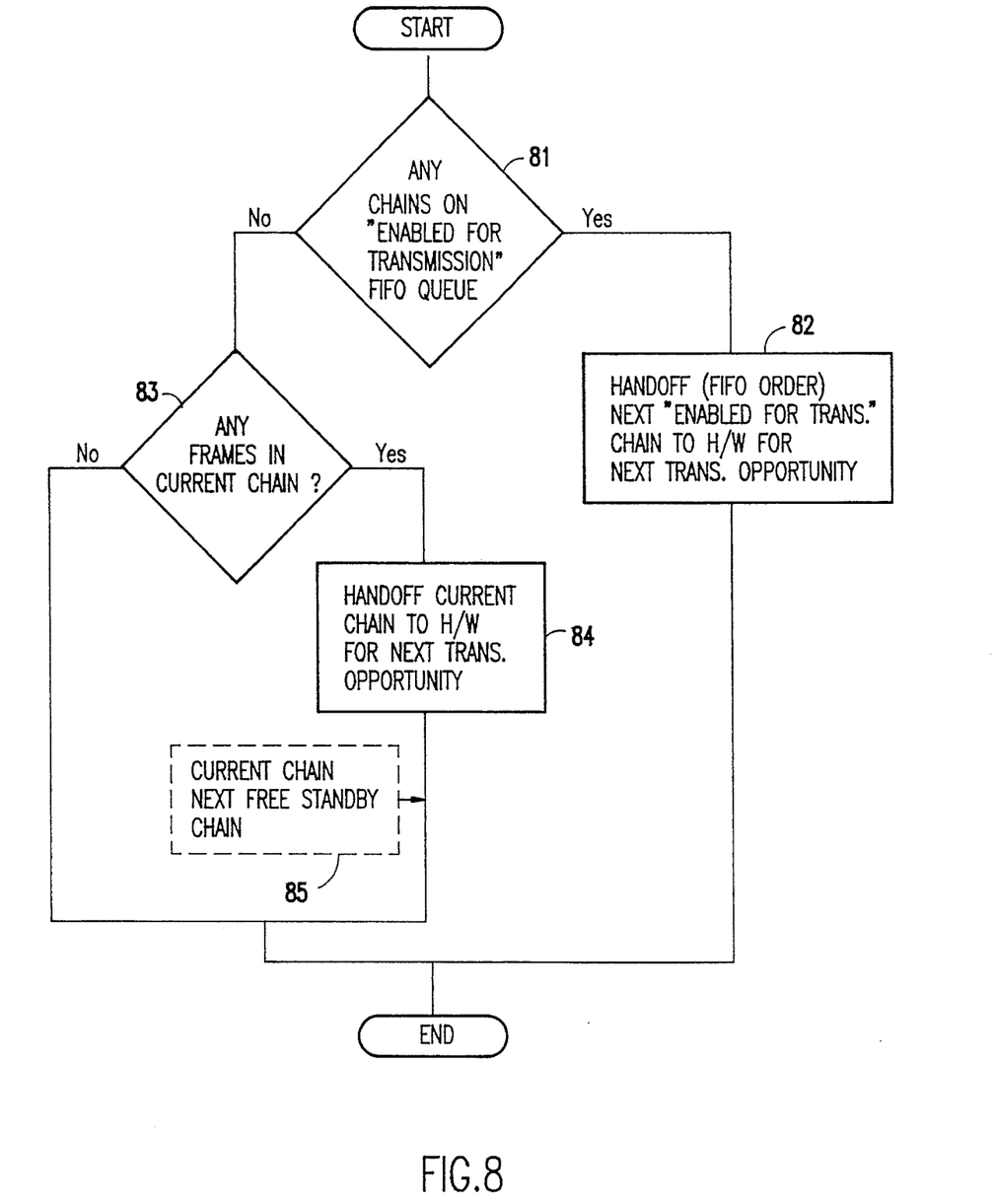
FIG. 8 is flow diagram of the logic of the implementation of the protocol upon chain transmission.

FIG. 8 is a flow diagram of the logic upon chain transmission. The process starts by determining in decision block 81 whether any chains are on the "enabled for transmission" FIFO queue. If so, the next "enabled for transmission" chain is handed off to hardware for the next transmission opportunity in function block 82, and the process ends. If not, a further test is made in decision block 83 to determine if there are any frames in the current chain. If so, the current chain is handed off to the hardware for the next transmission opportunity in function block 84. The next free standby chain becomes the current chain, as indicated by dotted function block 85, and the process ends. If there are no frames in the current chain, as determined in decision block 83, no action is taken and the process ends.

It is this second part of the protocol which optimizes the flow control for so many possible variations in throughput with a single algorithm that is the distinguishing feature of the invention. Other functions such as Pause and Resume of a multi-media data stream are automatically managed by this protocol without the need for intervening commands or control. The pausing and resuming of the data stream is simply treated as another variation in the bit rate and managed accordingly with the above algorithms.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. In a Fiber optic Distributed Data Interface (FDDI) network, a flow control protocol used to optimize the throughput on transmission opportunities without exceeding an allocated bandwidth in said Fiber optic Distributed Data Interface (FDDI) network, said Fiber optic Distributed Data Interface (FDDI) network supporting synchronous transmission of multimedia data among a plurality of stations connected to the network, said flow control protocol comprising the steps of:

limiting a number of frames that a station can chain together to a maximum number that insures that the station does not exceed its bandwidth allocation per transmission opportunity;

building at a station a chain of frames for transmission on the network;

calculating an optimal number of frames for chaining prior to placing a chain in a transmission queue; and completing a chain having said optimal number of frames before the maximum number of frames are chained together to optimize throughput by a reduction in bit rate or in the event of an early transmission opportunity.

2. The flow control protocol recited in claim 1 further comprising the step of completing a chain with the maximum number of frames to achieve the maximum throughput for an allocated bit rate or in the event of a late transmission opportunity.

3. The flow control protocol recited in claim 1 wherein a total number of bytes per a negotiated response time, T Negotiated, is T and a selected frame size is F bytes/frame, then a maximum number, n, of frames which can be chained together in an active session is T/F rounded up to nearest integer.

4. The flow control protocol recited in claim 3 wherein packetization of data into frames is based on a fixed byte count.

5. The flow control protocol recited in claim 3 wherein packetization of data into frames is based on fixed time intervals.

6. A multimedia network comprising:

a Fiber optic Distributed Data Interface (FDDI) network connecting a plurality of stations supporting multimedia applications, said Fiber optic Distributed Data Interface (FDDI) network supporting synchronous transmission of multimedia data among a plurality of stations connected to the network; and means in said Fiber optic Distributed Data Interface (FDDI) network implementing a flow control protocol to optimize the throughput on transmission opportunities without exceeding an allocated bandwidth, said flow control protocol limiting a number of frames that a station can chain together to a maximum number that insures that the station does not exceed its bandwidth allocation per transmission opportunity, building at a station a chain of frames for transmission on the network, and calculating an optimal number of frames for chaining prior to placing a chain in a transmission queue wherein said chain is completed before the maximum number of frames are chained together to optimize throughput by a reduction in bit rate or in the event of an early transmission opportunity.

* * * * *